US012430690B1

(12) United States Patent
Anand et al.

(10) Patent No.: US 12,430,690 B1
(45) Date of Patent: Sep. 30, 2025

(54) BUDGET-BASED APPROVAL-LESS ORDERING FOR PUNCHOUT USERS IN AN ECOMMERCE MARKETPLACE

(71) Applicant: Amazon Technologies, Inc., Seattle, WA (US)

(72) Inventors: Ankur Anand, Hyderabad (IN); Vikash Kumar Jain, Hyderabad (IN); Manish Kumar, Sriganganagar (IN); Abhinav Kasliwal, Shoreline, WA (US); Santosh Vasant Bhosale, Bothell, WA (US); Hersh Nagar, Snoqualmie, WA (US); Brandon Le, Austin, TX (US); Satya S Mishra, Redmond, WA (US); Neha Goswami, Bellevue, WA (US); Steven David Kann, Mercer Island, WA (US); Yi Lu, Bellevue, WA (US); Kian Leong Ong, Lynnwood, WA (US)

(73) Assignee: Amazon Technologies, Inc., Seattle, WA (US)

( * ) Notice: Subject to any disclaimer, the term of this patent is extended or adjusted under 35 U.S.C. 154(b) by 523 days.

(21) Appl. No.: 17/364,116

(22) Filed: Jun. 30, 2021

(51) Int. Cl.
*G06Q 40/12* (2023.01)
*G06Q 30/0601* (2023.01)

(52) U.S. Cl.
CPC ........ *G06Q 40/12* (2013.12); *G06Q 30/0633* (2013.01); *G06Q 30/0641* (2013.01)

(58) Field of Classification Search
None
See application file for complete search history.

(56) References Cited

U.S. PATENT DOCUMENTS

| 5,319,542 | A  | * | 6/1994 | King, Jr. | ............ | G06Q 30/0635 |
|---|---|---|---|---|---|---|
|   |   |   |   |   |   | 705/26.81 |
| 5,799,289 | A  | * | 8/1998 | Fukushima | ............ | G06Q 40/12 |
|   |   |   |   |   |   | 705/30 |
| 8,433,650 | B1 | * | 4/2013 | Thomas | ................ | G06Q 40/02 |
|   |   |   |   |   |   | 705/38 |
| 9,646,450 | B2 | * | 5/2017 | Melik-Aslanian | ..... | G06Q 40/03 |
| RE47,762 | E  | * | 12/2019 | Thomas | ................ | G06Q 10/06 |
| 2009/0132342 | A1 | * | 5/2009 | Klinger | ............. | G06Q 30/0242 |
|   |   |   |   |   |   | 705/7.29 |
| 2009/0132389 | A1 | * | 5/2009 | Klinger | ................. | G06Q 30/02 |
|   |   |   |   |   |   | 705/26.1 |
| 2011/0258083 | A1 | * | 10/2011 | Ren | .................... | G06Q 30/0633 |
|   |   |   |   |   |   | 705/26.1 |
| 2012/0022963 | A1 | * | 1/2012 | Tung | ..................... | G06Q 30/06 |
|   |   |   |   |   |   | 705/26.2 |
| 2017/0196125 | A1 | * | 7/2017 | Crosby, Jr. | ................ | E04B 1/18 |

(Continued)

*Primary Examiner* — Fateh M Obaid
(74) *Attorney, Agent, or Firm* — Klarquist Sparkman, LLP

(57) ABSTRACT

A customer eProcurement system enables a blanket purchase order on a supplier website to establish a budget, which buyers can use without the need to take their cart back to the customer eProcurement system. The budget value for a buyer or a group of buyers allows them to perform their buying functions without the need for further internal processing by the customer system so long as purchases are within the budget. The blanket purchase order allows buyers to place the orders directly on the supplier website, while at the same time following policies of the customer eProcurement system and allows easier order reconciliation within the customer system.

19 Claims, 8 Drawing Sheets

(56) References Cited

U.S. PATENT DOCUMENTS

| | | | |
|---|---|---|---|
| 2017/0330159 A1* | 11/2017 | Castinado | G06Q 20/02 |
| 2020/0302417 A1* | 9/2020 | Wyper | G06Q 30/04 |
| 2021/0117986 A1* | 4/2021 | Harris | G06Q 30/0635 |
| 2022/0058719 A1* | 2/2022 | Jain | G06Q 30/0635 |

* cited by examiner

BUDGET-BASED APPROVAL-LESS ORDERING FOR PUNCHOUT USERS IN AN ECOMMERCE MARKETPLACE

BACKGROUND

In a business-to-business (B2B) eCommerce context, business customers often use online supplier marketplaces to purchase products directly from other businesses or the B2B goods suppliers. For example, businesses can purchase office supplies, manufacturing parts, janitorial supplies, and other products directly from other businesses. B2B buyers often use their home grown or 3P procurement systems (also referred to as eProcurement systems, spend management systems, punchout systems, supplier management portals, travel & expense management systems, etc.) to manage such procurement needs. Such systems are integrated with the supplier's marketplace to allow their employees or authorized users of the procurement systems to make purchases from the supplier's marketplace. The use of such systems allows for greater visibility and control into the organization's purchases and for compliance with internal policies of the businesses.

For example, users can log into the 3P procurement system, then via links in the 3P system (e.g., via a click button), login to the supplier's marketplace (e.g., supplier system). Once they are in the supplier marketplace, the user then searches for the items to buy and builds a shopping cart of these items. This method of accessing a supplier's web-catalog, eCommerce website, or marketplace from within the B2B buyer's procurement system is often referred to as "Punchout." Once a buyer "punches out" and builds the cart on the supplier's website, the user then transfers the cart back to their procurement system. Thus, the customer's employees can access and shop in an eCommerce website without leaving the customer's platform. After the shopping cart is received back in the customer's procurement system, the buyer performs administrative actions within the procurement system to send the cart for approval to their supervisor, who approves the cart. After approval, the procurement system sends a purchase order to the supplier system.

Generally, the flow is complicated and requires checks for all purchases by the procurement system.

DETAILED DESCRIPTION

A customer eProcurement system enables a blanket purchase order on a supplier website to establish a budget, which buyers can use without the need for further approval by the customer eProcurement system. The budget value for a buyer or a group of buyers allows them to perform their buying functions without the need for further internal processing by the customer system so long as purchases are within the budget. The blanket purchase order allows buyers to place the orders directly on the supplier website, while at the same time following policies of the customer eProcurement system and allows easier order reconciliation within the customer system.

Figure 1:
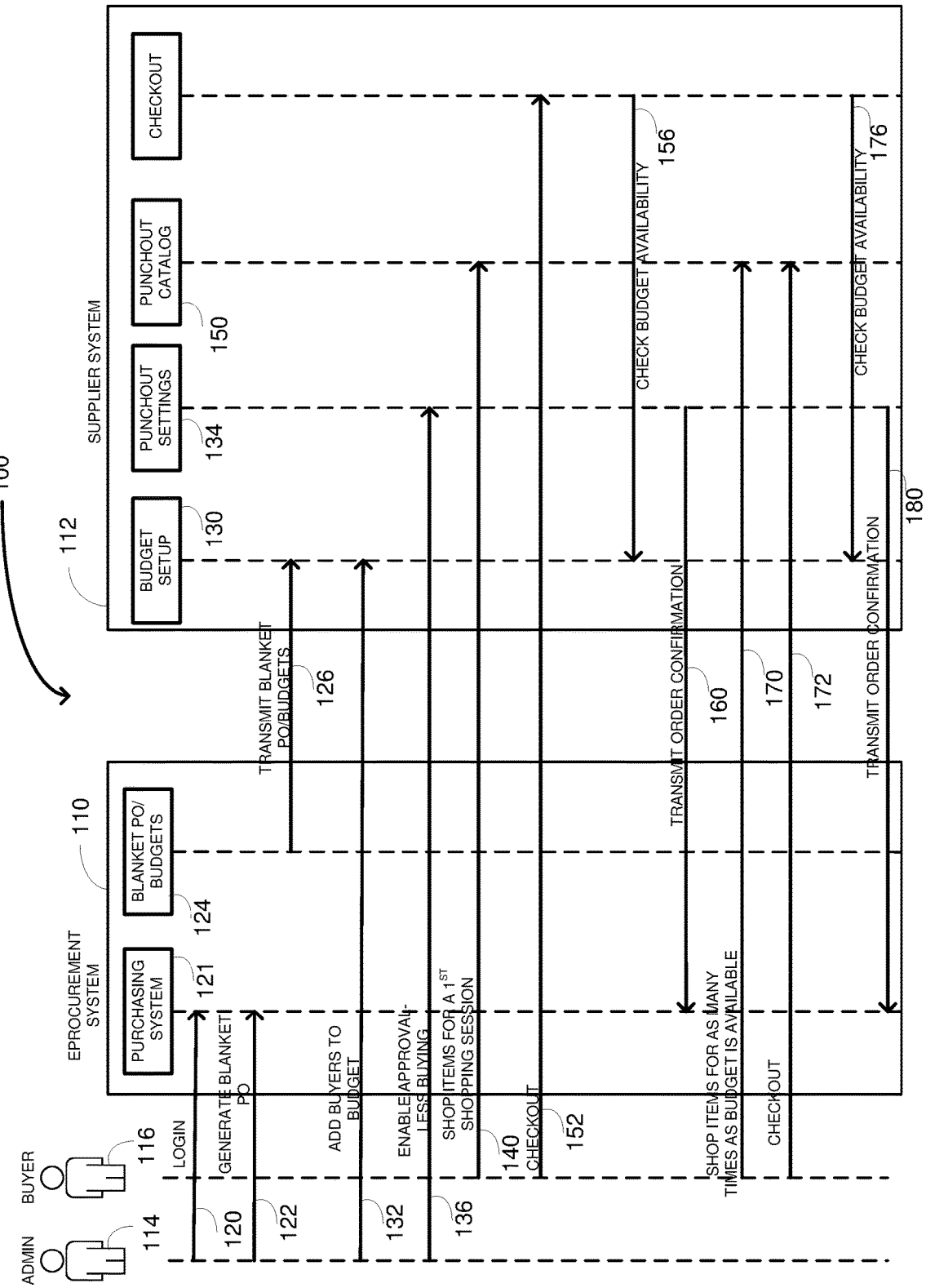
FIG. 1 shows interactions between an eProcurement system and a supplier system to provide a budget and approval-less buying.

FIG. 1 shows a system 100 including an eProcurement system 110 and a supplier system 112. Interactions are shown between an administrator 114 of the eProcurement system 110, a buyer 116, and the supplier system 112. The supplier system 112 is an online marketplace allowing consumers and businesses to purchase products using ecommerce and is typically executing on a plurality of server computers. The buyer 116 is an employee of a third party responsible for the eProcurement system 110, which requires approvals of purchases made by the buyer on behalf of the business. The third party is any business that desires purchasing goods from the supplier system 112 in a B2B eCommerce context. More generally, the third party can host the eProcurement system 110 or any system that performs ecommerce activity. The administrator 114 is also an employee of the third party and has authority to configure the eProcurement system 110. Although not shown, the administrator 114 and buyer 116 use one or more client devices to access the eProcurement system 110 and the supplier system 112. The client devices can be any type of client device, such as a mobile phone, tablet, laptop computer, etc.

At 120, the administrator 114 logs into a purchasing system 121 of the eProcurement system 110 and at 122 generates a blanket purchase order (PO) or budget 124. The blanket PO or budget 124 can include a value of a budget to be used against the PO. At 126, the blanket PO or budget is transmitted to the supplier system 112 and stored in a budget setup storage 130. At 132, the administrator 114 assigns buyers to the budget and transmits identifiers associated with the buyers to the supplier system 112, where the identifiers are stored in the budget setup 130. The budget can be further associated with products or categories. For example, the system can have capabilities to have budgets for restricted product categories in accordance with product/category codes. At 136, the administrator enables approval-less buying, which is stored in the punchout settings 134 in the supplier system 112. The approval-less buying allows authorized buyers associated with a budget to purchase items at the supplier system 112 without requiring further approval by the eProcurement system 110. Thus, the setup 136 can include information relating to enabling or disabling the approval-less buying together with an identifier of the budget for which it is associated.

At 140, the buyer 116 shops for items in a punchout catalog 150. The punchout catalog 150 includes items for purchase that can be placed in a virtual shopping cart, as is traditionally understood in online shopping. The buyer 116 can access the supplier system 112 through the eProcurement system 110 by logging into the eProcurement system first and accessing the supplier website through the eProcurement system.

At 152, the buyer 116 proceeds to checkout by selecting a UI element indicating that the buyer has completed the shopping. At 156, the supplier system 112 checks budget availability by checking the budget stored at storage 130. Approval-less buying can be assumed if there is budget available. If the budget is sufficient to purchase, then without further authorization from the eProcurement system 110, the order is placed and an order confirmation is transmitted to the eProcurement system 110 as shown at 160. The budget is adjusted by subtracting the value of the purchased products from the budget to obtain a new budget availability, which is stored in the budget setup storage 130.

If desired, the buyer 116 can initiate a second shopping session and shop for additional items as shown at 170. The buyer again checks out at 172. The supplier system 112 checks the revised budget (at 176). If the revised budget has sufficient funds, the order is placed without further approval from the eProcurement system and an order confirmation is transmitted to the eProcurement system at 180. The buyer can continue shopping and completing orders as many times as desired until the budget is insufficient to pay for the items being purchased.

Figure 2:
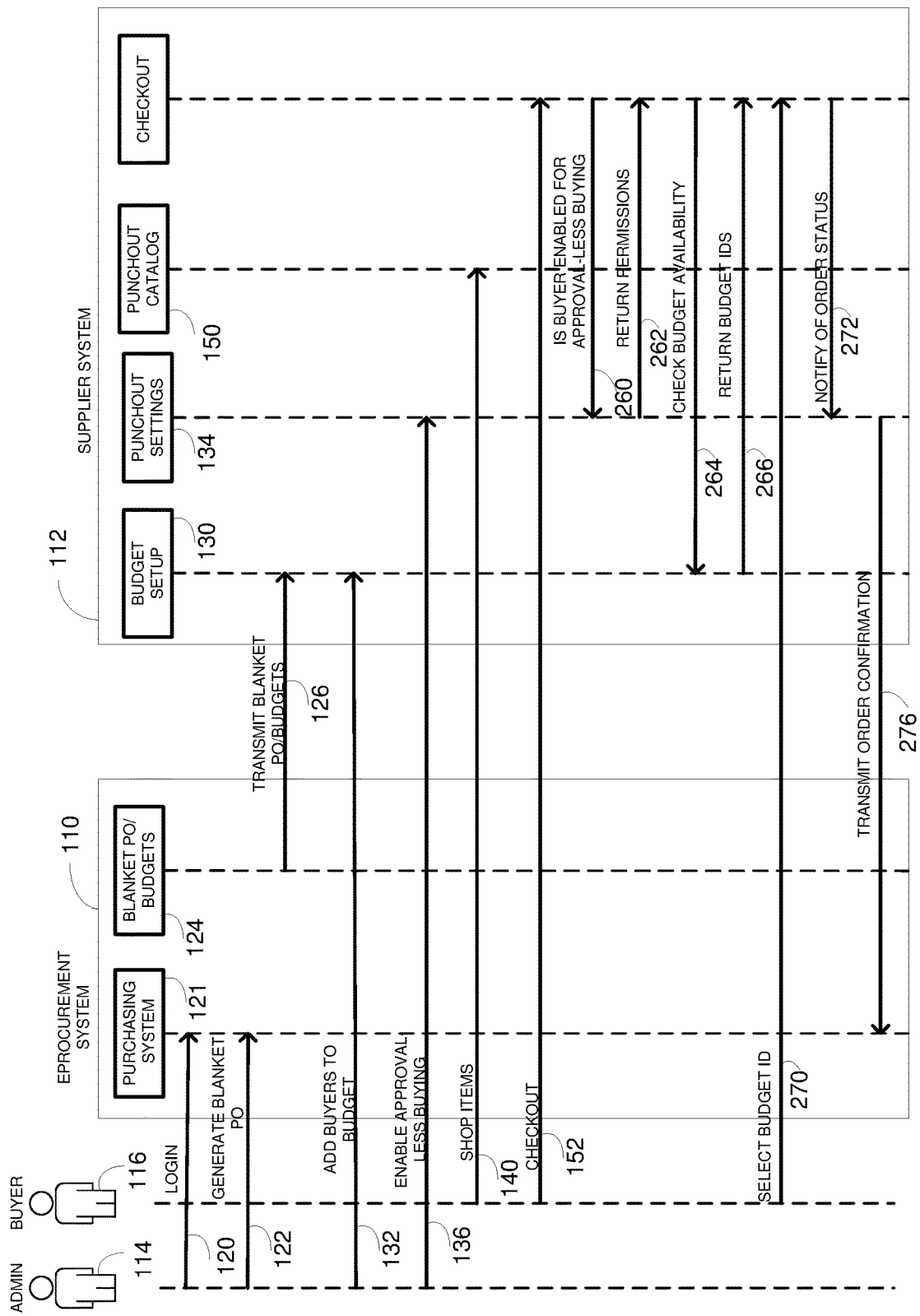
FIG. 2 shows a more detailed example of interactions between an eProcurement system and a supplier system to provide a budget and approval-less buying.

FIG. 2 shows additional steps that can be implemented. Steps between 120 and 152 are similar to FIG. 1 and are not re-described for simplicity. At 260, a check is made whether the current buyer is approved for approval-less purchases by requesting the punchout settings 134. At 262, the permissions from the punchout settings 134 are returned. If approval-less purchases are allowed, then at 264, budget availability is checked and a plurality of different budgets are returned from the budget setup storage 130, as shown at 266. The buyer can then be displayed budget options from the plurality of different budgets, and the buyer can select one of the available budgets, as shown at 270. If the budget is sufficient to pay for the selected items, then a notification of order status is made (at 272) to the punchout settings 134 and the order is placed. Although not shown, the budget is revised by subtracting a cost of the purchased items from the current budget. Finally, at 276, the supplier system 112 transmits an order confirmation to the eProcurement system 110.

Figure 3:
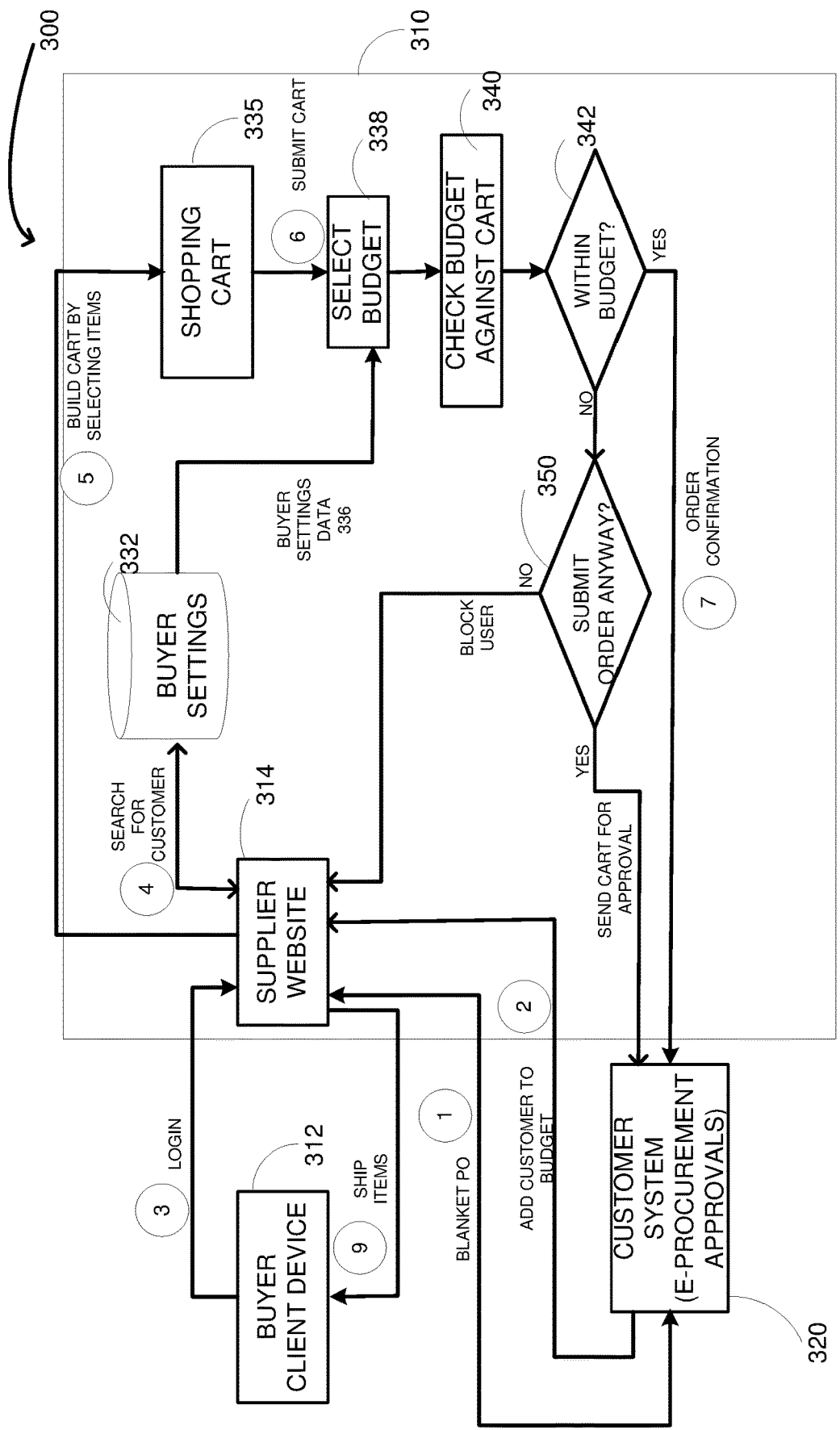
FIG. 3 is an example system diagram showing a flow between a buyer client device, a customer system and a supplier network.

FIG. 3 shows a first embodiment of a system 300 for ordering products directly through a supplier network 310. A buyer operating a client device 312 accesses a supplier website 314 of the supplier system 310. The supplier website 314 is an online marketplace allowing consumers and businesses to purchase products using ecommerce. The supplier website 314 is typically executing on a plurality of server computers within the supplier network 310. The buyer is an employee of a customer system 320 that requires approvals of purchases made by the buyer on behalf of the business. The customer system is any business that desires purchasing goods from the supplier system 310 in a B2B eCommerce context. More generally, the customer system can be an eProcurement system or any system that performs ecommerce activity. The client device 312 can be any client device, such as a mobile phone, tablet, laptop computer, etc. Notably, the buyer operating the client device 312 does not login to the customer system 320 and access the supplier system 310 through the customer system. Instead, the buyer operating the client device 312 logs directly into the supplier website 314. The supplier system 310 further includes a database 332 for storing buyer settings. For example, an administrator of the customer system 320 configures a buyer business account for enabling purchasing directly (i.e., without logging into the customer system) from the supplier system 310. The administrator further provides an identification strategy allowing the supplier system 310 to identify the buyer 312 as associated with the customer system 320. Example, identification strategies include using a user-specific unique identifier (Email ID, Mobile Number, third-party common keys, cookie, token, etc.), SSO details or Third-Party authentication and authorization. Other configurations can include budgets that are available to buyers in the buyer settings 332. Still other configurations include defining whether a push or pull model is used for supplying a shopping cart to the customer system 320, providing a URL in the customer system 320 where to push the shopping cart details, providing an authentication technique to be used for communications between a supplier system 310 and the customer system, etc. To configure the buyer settings 332, the customer system 320 can submit the settings through an API to the supplier website 314. The supplier website 314 can then populate the buyer settings in the database 332.

To further understand interactions between the buyer client device 312, the customer system 320 and the supplier system 310, circled numbers are indicated relating to example steps that can occur. At 1, the customer system 320 submits a blanket PO to the supplier website 314. The blanket PO can have a value associated with it which the supplier can use to generate a budget associated with the customer system 320. At 2, the customer system can attach one or more buyers to the budget. The budget and associated buyers are stored in the database 332. There can be multiple budgets assigned to a single buyer. At 3, a buyer using the buyer client device 312 logs directly into a supplier website 314 to purchase goods, just the same as a general consumer (unaffiliated with the customer system) logs into the supplier website 314. The buyer login is typically using credentials associated with a business account. At 4, the supplier website 314 searches the buyer login details in the database 332, such as by searching using a parameter of the credentials as a key (e.g., an email address). If a match is found, then the supplier website 314 identifies the buyer as associated with the customer system. Other business account details and setup properties are also retrieved from the database 332. At 5, the buyer creates a shopping cart 335 on the supplier website 314, such as by placing one or more products in a shopping cart for purchase. The shopping cart is software that includes identifiers associated with products to purchase. At 6, the buyer submits the shopping cart 335 for purchase and the supplier system 310 checks the previously retrieved properties (shown as buyer settings data 336). If the buyer is associated with the customer system, then a control (UI element or button) 338 is displayed. The control asks the buyer to select from a plurality of available budgets. The buyer can then select which of the plurality of budgets applies or if only one budget is displayed, the buyer can select that budget. At 340, a value of the selected budget is compared against the value of the shopping cart 335. In decision block 342, a check is made whether the value of the shopping cart is within the budget selected. If not, then at 350, the buyer is asked whether the cart should be sent to the customer system for approval. If yes, then the cart is sent to the customer system for approval. Otherwise, the order is rejected and the buyer is blocked from purchasing the products and is returned to the supplier website 314 to modify the shopping. If the value is within the budget, then the order is approved. At 7, an order confirmation is transmitted to the customer system. One advantage of the system is that one or more blanket POs can be submitted to a supplier website and assigned to a buyer. The buyer can select amongst the different budgets to be applied to the purchase. Additionally, the supplier system can approve the order using the available budget without further authorization from the customer system.

Figure 4A:
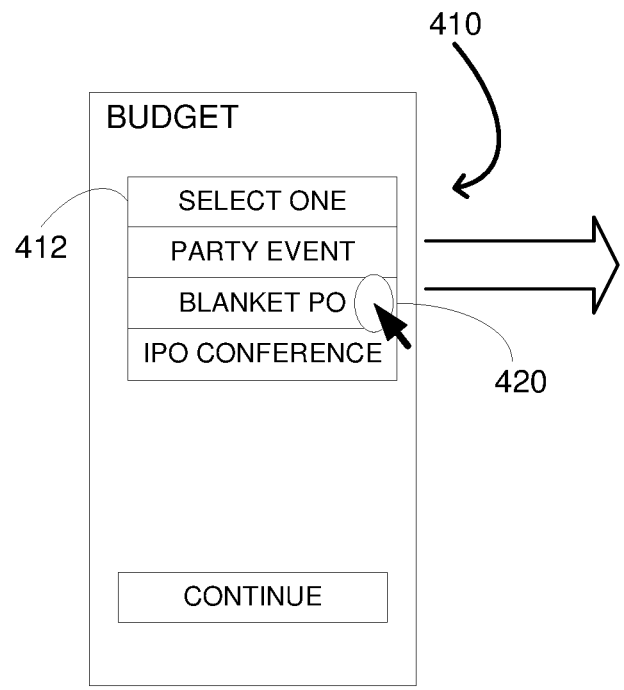
FIG. 4A is an example User Interface (UI) allowing a user to select between different budgets.
Figure 4B:
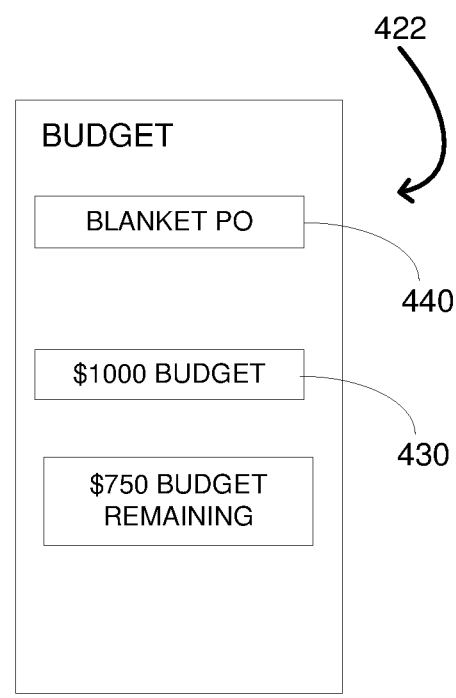
FIG. 4B is the example UI with a blanket purchase order selected.

FIG. 4A is an example UI 410 allowing a user to select between different budgets. A pull-down menu 412 can be displayed to the user including different available budgets. As shown at 420, the user selects a blanket PO. FIG. 4B shows a next-screen UI 422 following the selection of the blanket PO. A display element 430 indicates an amount of available budget. Display element 440 indicates that blanket PO was chosen from the pull-down menu. Other interface designs can be used.

Figure 5:
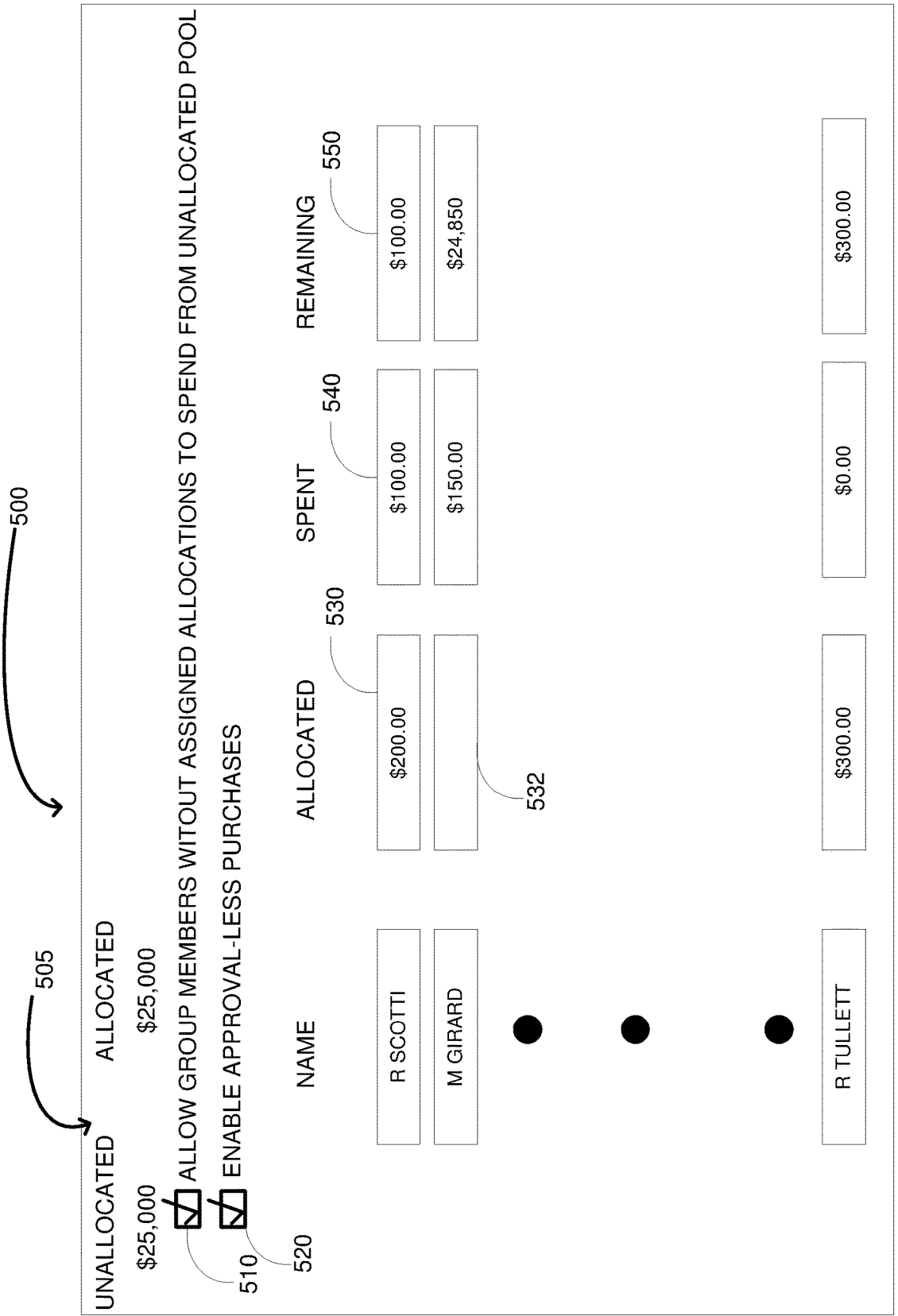
FIG. 5 is an example UI with multiple buyers allowing to use a budget from the blanket purchase order.

FIG. 5 shows another example UI 500 with selectable budget features. At 505, different budget types are displayed including an unallocated budget and an allocated budget. The available amounts assigned to each of the unallocated and allocated budgets are also displayed. At 510, a check box can be selected that allows group members without assigned allocations to use the unallocated budget. A check box 520 enables purchases using either the unallocated or allocated budgets without further approval by the customer system. Example allocations are shown with names of buyers associated with the customer system and allocated budgets. While R. Scotti is shown with an allocated budget of $200 (see at 530), M. Girard has no allocated budget (see at 532). Accordingly, R. Scotti's purchases are applied from the allocated budget, while M. Girard's purchases are pulled from the unallocated budget. Additionally, at 540, the UI indicates an amount of money that R. Scotti spent and, at 550, the UI indicates an amount remaining of the original $200.00.

Figure 6:
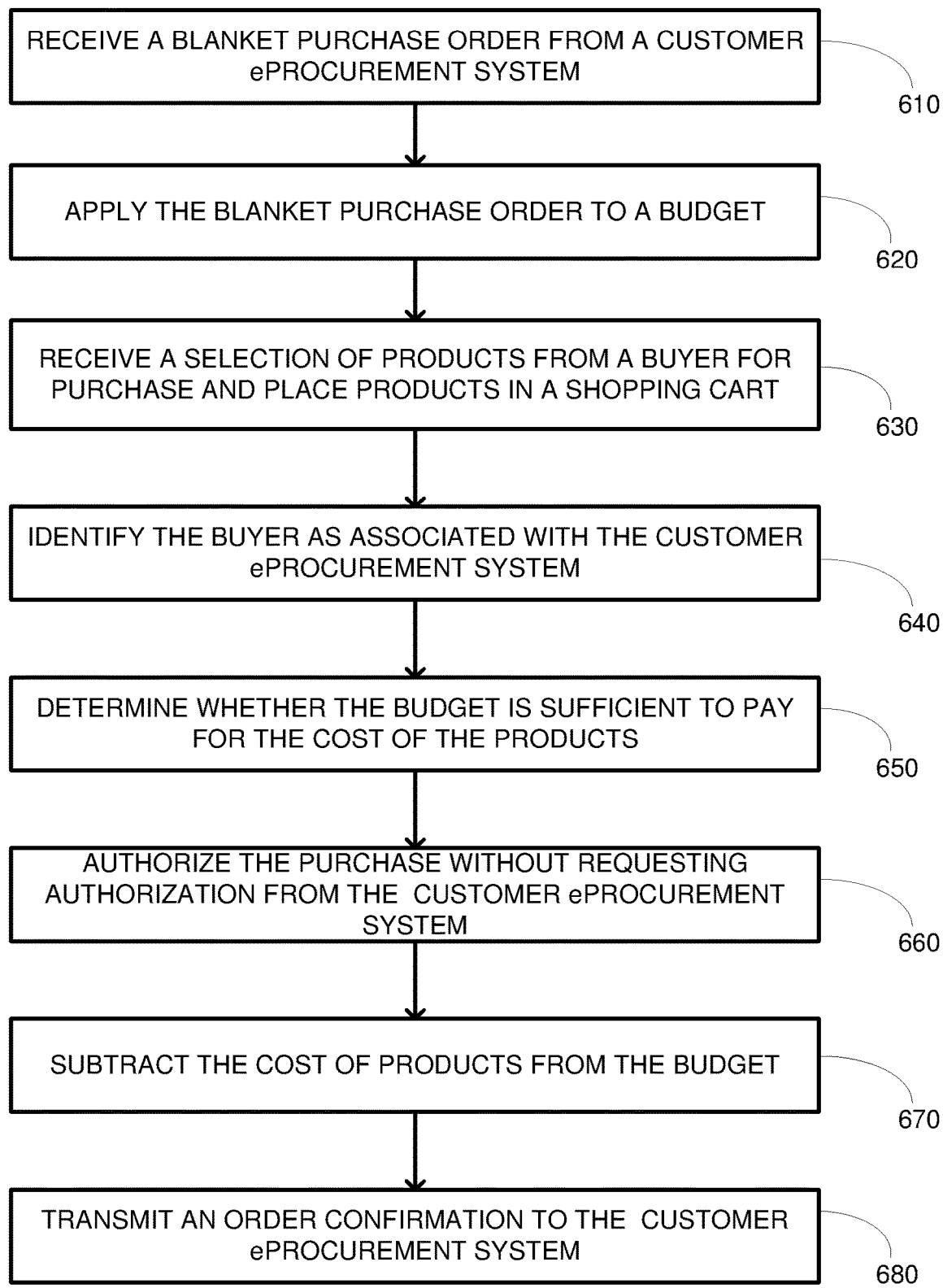
FIG. 6 is a flowchart according to one embodiment for approval-less buying from a supplier website.

FIG. 6 is a flowchart according to one embodiment for purchasing products on a supplier website. In process block 610, a blanket PO is received from a $3^{rd}$ party eProcurement system. The blanket PO is an agreement to pay a certain sum for purchases on behalf of an employee without specifying the products being purchased. This allows the employee to purchase products that can be applied against the blanket PO. Multiple rounds of purchases can be applied against the same blanket PO until a budget associated with the blanket PO is used. In process block 620, the blanket purchase order is applied to a budget. For example, the blanket PO received in process block 610 can have a budget value associated with it. Additionally, names can be associated with the blanket PO to identify which employees can purchase against the blanket PO. In some cases, the blanket PO can be used to generate a new budget for employees to use to purchase goods. In process block 630, a selection of products is received from a buyer for purchase and the products are placed in a shopping cart. In process block 640, the buyer is identified as associated with the customer eProcurement system. For example, in FIG. 3, the user's login credentials are compared against login credentials in the buyer settings database 332. If a match is found, then a UI, such as FIG. 4, is presented to the buyer so that the buyer can select a blanket PO 420. In process block 650, a determination is made whether the budget is sufficient to pay for the cost of the products selected by the buyer. A simple comparison can be made of the price of the products vs. the value of the remaining budget. If the budget is insufficient, the purchase is rejected. However, in process block 660, if there is sufficient budget, then the purchase is authorized without requesting further authorization from the customer eProcurement system. For example, the blanket PO budget is applied against the purchase and is considered pre-authorization from the customer eProcurement system. In process block 670, the cost of the products is subtracted from the current budget to leave a remaining budget. For example, in FIG. 5, an amount of remaining budget 550 is calculated by subtracting the amount spent 540 from the allocated budget 530. In process block 680, after the order is placed using the blanket PO as authorization, an order confirmation is transmitted to the customer eProcurement system.

Figure 7:
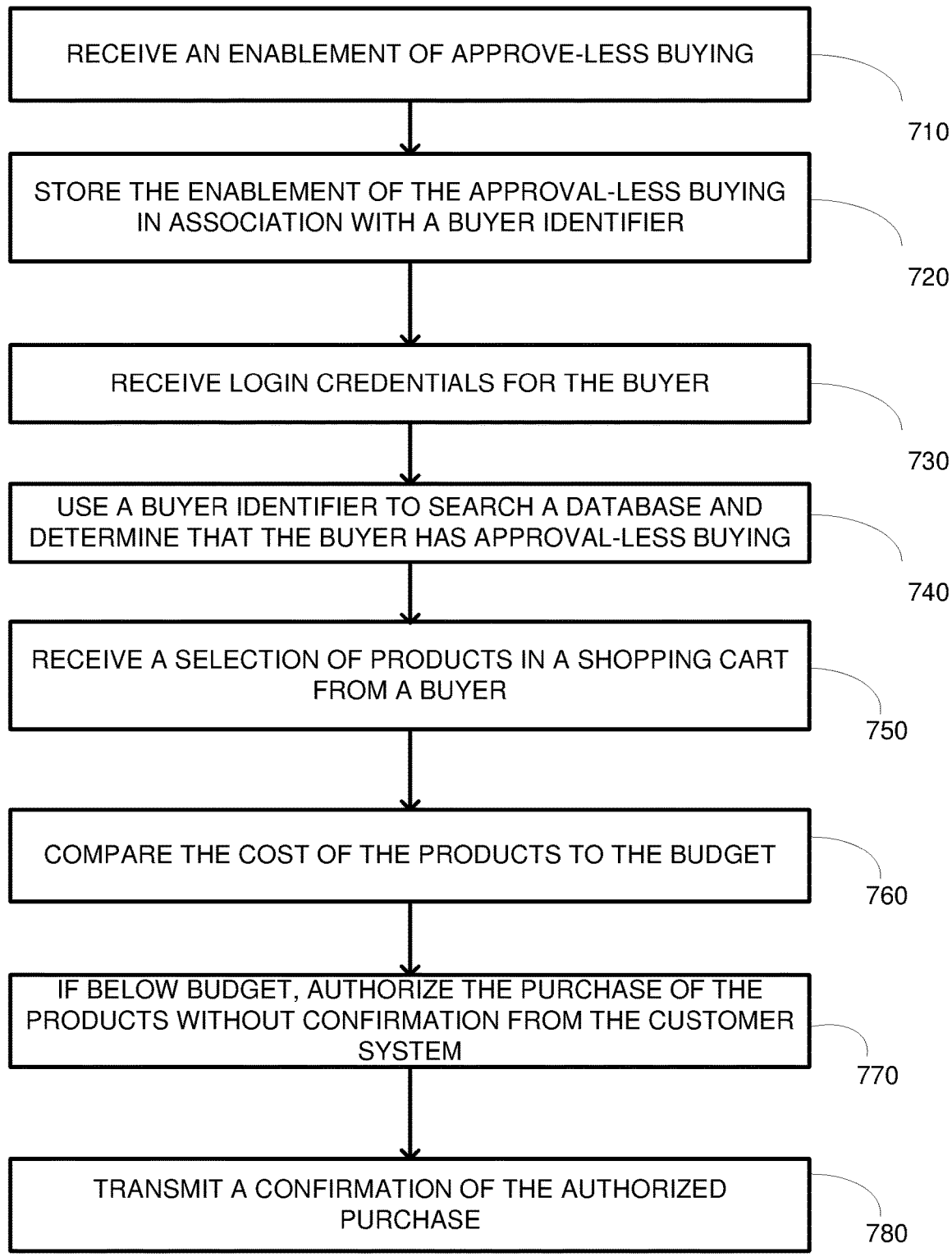
FIG. 7 is a flowchart according to another embodiment for approval-less buying from a supplier website.

FIG. 7 shows a flowchart according to another embodiment for making approval-less purchases on a supplier e-commerce marketplace. In process block 710, approval-less buying can be enabled on the supplier e-commerce marketplace. For example, in FIG. 1, an administrator 114 enables approval-less buying at 136. A further example is shown in FIG. 5, wherein the administrator 114 can check box 520 in the UI 500. In process block 720, the enablement is stored in association with a buyer identifier. For example, in FIG. 3, the database 332 can be used to store the enablement information in association with the buyer. In process block 730, login credentials are received for the buyer. In process block 740, the buyer identifier from the login credentials can be used to search the database 332 and determine that the buyer has approval-less buying enabled. In process block 750, a selection of products is received from a buyer and placed in a shopping cart. In process block 760, a comparison is made between the cost of the products and the budget. For example, FIG. 5 shows a remaining budget 550 for one of the buyers. Such a budget can be retrieved for whatever buyer is currently checking out of the e-commerce marketplace and subtracted from the cost of the products. In process block 770, if the current products being purchased have a total purchase price that is below the budget, then the purchase is authorized without further confirmation from the customer system. If, however, the total purchase price exceeds the budget, then the purchase is rejected. In process block 780, a confirmation of the authorized purchase is transmitted to the customer system. Thus, in FIG. 3, at 7, the order confirmation is sent from the supplier system 310 to the customer system 320.

Figure 8:
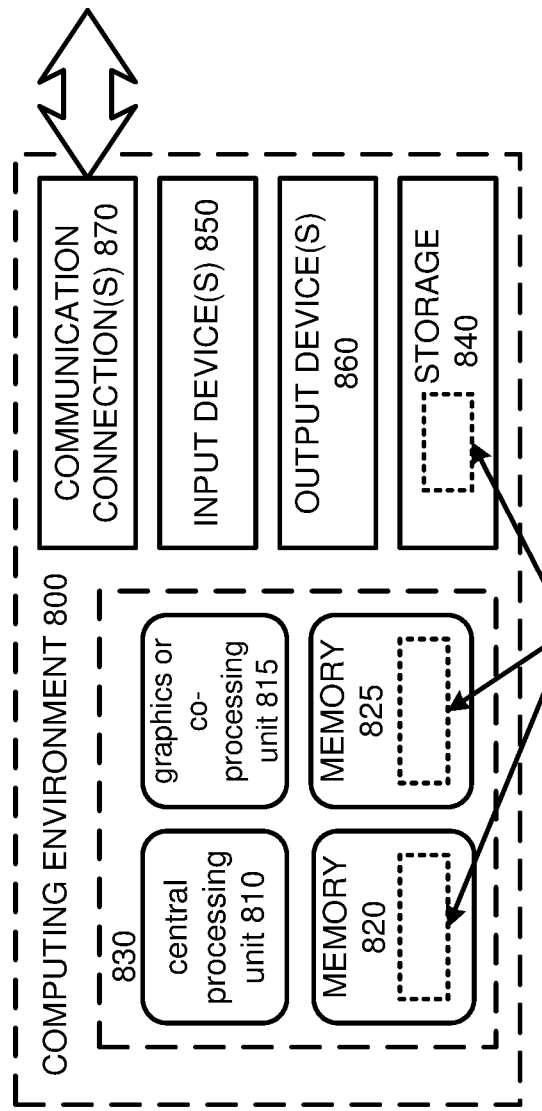
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.).

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s). The computing environment 800 can be used, for example, to implement the supplier system 310.

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of purchasing products on a supplier website for a business, the method comprising:

receiving an electronic message associated with a blanket purchase order from a customer eProcurement system, wherein the blanket purchase order is associated with a buyer;

converting the blanket purchase order to a budget associated with the customer eProcurement system and storing the budget in association with the buyer on a supplier website;

receiving login credentials from the buyer on the supplier website, wherein one or more server computers are associated with the supplier website and receive the login credentials from the buyer on an electronic client device without the buyer being logged into the customer eProcurement system;
receiving a selection of one or more products from the electronic client device for purchase and placing the one or more products in a shopping cart of the supplier website;
identifying the buyer as associated with the customer eProcurement system by searching the login credentials of the buyer in a database and retrieving corresponding buyer settings including the budget, wherein the one or more server computers associated with the supplier website performs the searching of the database;
determining whether the budget is sufficient to pay for a cost of the one or more products in the shopping cart;
if the budget is sufficient, authorizing purchase of the one or more products without requesting authorization from the customer eProcurement system;
subtracting the cost of the one or more products from the budget to generate a remaining budget and storing the remaining budget in the database; and
transmitting an order confirmation from the one or more server computers associated with the supplier website to the customer eProcurement system, which is external to the supplier website and includes one or more server computers.

2. The method of claim 1, further including receiving an enablement for approval-less purchases for the buyer.

3. The method of claim 1, wherein the budget is a first of a plurality of budgets and further including receiving a selection from the buyer of which of the plurality of budgets applies for payment of the one or more products.

4. The method of claim 1, wherein the selection of the one or more products is a first selection and, the method further comprises:
receiving, after the order confirmation is transmitted, a second selection of products to purchase from the buyer;
determining whether the remaining budget is sufficient to pay for the second selection of products; and
if the remaining budget is sufficient, authorizing purchase of the second selection of products without requesting authorization from the customer eProcurement system.

5. The method of claim 1, wherein the buyer accesses the supplier website either directly or through the customer eProcurement system.

6. A method, comprising:
receiving, within a supplier website, an enablement of approval-less buying for a buyer having a buyer identifier, wherein the buyer is authorized to purchase products without approval by an eProcurement system order approval system associated with a customer, wherein one or more server computers are associated with the supplier website;
storing the enablement of the approval-less buying in a database in association with the buyer identifier, wherein the database is coupled to the one or more server computers associated with the supplier website;
receiving login credentials for the buyer to access the supplier website, wherein the login credentials include the buyer identifier, wherein the login credentials are received from the buyer on an electronic client device without the buyer being logged into the customer eProcurement system;
using the buyer identifier to search the database and determining that the buyer has approval-less buying and using the buyer identifier to retrieve a budget authorized by the buyer, wherein the budget is stored on a supplier system associated with the supplier website;
receiving a selection of one or more products in an electronic shopping cart from the buyer;
comparing whether a cost of the shopping cart is below the budget;
if the cost is below the budget, authorizing a purchase of the one or more products without further authorization from the eProcurement system; and
transmitting, from the one or more server computers associated with the supplier website, to the eProcurement system, a confirmation of the authorized purchase, wherein the eProcurement system is external to the supplier website.

7. The method of claim 6, further comprising:
if the cost of the shopping cart is above the budget, then rejecting the purchase.

8. The method of claim 6, further including receiving a blanket purchase order from the eProcurement system and generating the budget from the blanket purchase order.

9. The method of claim 6, wherein the eProcurement system is a system that performs ecommerce activity.

10. The method of claim 6, wherein the budget is a first of a plurality of budgets and further including receiving a selection from the buyer of which of the plurality of budgets applies for payment of the one or more products.

11. The method of claim 6, wherein after the confirmation of the authorized purchase, receiving a selection of additional products and approving the additional products without authorization from the eProcurement system if a remaining budget is available.

12. The method of claim 6, wherein the buyer accesses the supplier website either directly or through the customer eProcurement system.

13. The method of claim 6, wherein the budget is associated with multiple buyers associated with the eProcurement system.

14. One or more non-transitory computer-readable storage media storing computer-executable instructions for causing a computing system to perform a method, the method comprising:
receiving a blanket purchase order from a customer eProcurement system to purchase products in a supplier website without authorization of the products by the customer eProcurement system, wherein one or more server computers are associated with the supplier website;
converting the blanket purchase order into a budget associated with one or more buyers and storing the budget on a supplier system;
receiving login credentials on the supplier website associated with the supplier system for a buyer of the one or more buyers associated with the customer eProcurement system, wherein the receiving the login credentials is from the buyer on an electronic client device without the buyer being logged into the customer eProcurement system;
searching in a database coupled to the one or more server computers associated with the supplier website for the login credentials of the buyer and based upon a result of the searching, determining that the buyer is associated with the budget;
authorizing a purchase of products by the buyer from the supplier website by using the budget as pre-approval by the customer eProcurement system; and
transmitting, to the customer eProcurement system, a confirmation of the authorized purchase.

15. The one or more non-transitory computer-readable storage media of claim 14, wherein the instructions further cause the computing system to:
   display, to the buyer, a plurality of potential budgets from which to select.

16. The one or more non-transitory computer-readable storage media of claim 14, wherein the customer eProcurement system does not authorize the purchase of the products except for the blanket purchase order.

17. The one or more non-transitory computer-readable storage media of claim 14, wherein the budget is associated with multiple buyers associated with the customer eProcurement system.

18. The one or more non-transitory computer-readable storage media of claim 14, further including instructions that further cause the supplier website to identify the buyer as associated with the budget and display an amount of the budget to the buyer.

19. The one or more non-transitory computer-readable storage media of claim 14, further including instructions that further cause the computing system to receive a selection of additional products and approve the additional products without authorization from the customer eProcurement system if a remaining budget is available.

\* \* \* \* \*